United States Patent [19]

Aoki

[11] 4,131,410
[45] Dec. 26, 1978

[54] INJECTION BLOW-MOLDING MACHINE

[76] Inventor: Katashi Aoki, 6037, Oaza Minamijo, Sakaki-machi, Hanishina-gun, Nagano-ken, Japan

[21] Appl. No.: 823,053

[22] Filed: Aug. 9, 1977

Related U.S. Application Data

[63] Continuation of Ser. No. 253,818, May 15, 1972, abandoned.

[30] Foreign Application Priority Data

May 21, 1971 [JP] Japan .................. 46-34628

[51] Int. Cl.² .......................................... B29D 23/03
[52] U.S. Cl. .................................. 425/533; 425/569; 425/570
[58] Field of Search .......................... 425/567–571, 425/577, 533, 540

[56] References Cited

U.S. PATENT DOCUMENTS 3,480,993  12/1969  Schjeldahl et al. ............... 425/156

Primary Examiner—Richard B. Lazarus
Attorney, Agent, or Firm—David H. Semmes

[57] ABSTRACT

An injection blow-molding machine comprising a pair of female mold-halves attached to a movable plate and a fixed plate respectively with a required number of parison cavities and blow-molding cavities being formed symmetrically in the mating plane of the mold-halves, a required number of male molds each having a blowing hole therethrough and supported around a male-mold supporting member fixed to a rotating shaft passed freely rotatably through one of the female mold-halves attached to the fixed plate, a hot-runner block provided adjacently to each of said parison cavities, a hot-runner nozzle disposed between the parison cavity and the hot-runner block, and a gate in the form of a channel provided for each parison cavity for forming the bottom portion of the parison to be apart from said hot-runner nozzle.

3 Claims, 6 Drawing Figures

INJECTION BLOW-MOLDING MACHINE

This is a continuation of application Ser. No. 253,818, filed May 15, 1972 and now abandoned.

BACKGROUND OF THE INVENTION

This invention relates generally to injection blow-molding machines, and more particularly to a type thereof wherein the formation of parisons is substantially improved.

In the technique of blow-molding, there are two types of metal molds forming parisons having bottoms, one being an integral mold and the other being a separable mold. In the former type metal mold, the parison having bottom formed in a portion thereof is drawn out in the axial direction into a blow-molding portion of the metal mold to be blown into an article. On the other hand, in the latter type metal mold, the parison formed therein is removed from the separable metal mold in a direction perpendicular to the axis of the parison and thereafter blown into an article.

Heretofore, difficulties have been experienced in the formation of parisons in the separable type injection metal mold employing a hot-runner. Parisons thus formed tend to be deformed or damaged at their bottoms at the time of the removal from the metal mold, and hence the productivity of this kind of machines has been extremely low.

Furthermore, because a hot-runner block is directly coupled to the fixed side of the injection metal mold, the temperature of the parison at the side contacting with the fixed mold-half becomes higher than the other side contacting with the movable mold-half, thus causing uneven blowing of the parisons.

To eliminate this difficulty, it has been attempted to separate the hot-runner block from the fixed mold-half by means of a hydraulic cylinder or the like and to attach the hot-runner block to the fixed mold-half only while the injection takes place. However, this makes the metal mold too much complicated and hence is found to be impracticable.

SUMMARY OF THE INVENTION

A general object of the present invention is to provide an injection blow-molding machine wherein all of the above mentioned difficulties can be substantially eliminated.

Another more specific object of the invention is to provide an injection blow-molding machine wherein the tendency of deforming and damaging the bottom of the parison, at the time of being removed from the mold, is substantially eliminated.

Still another object of the invention is to provide an injection blow-molding machine wherein the tendency of uneven blowing of the parison is totally eliminated.

A further object of the invention is to provide an injection blow-molding machine which is simple in construction and reliable in operation.

The above described and other objects of the present invention can be achieved by an improved injection blow-molding machine wherein a pair of separable mold-halves are provided to be attached to a fixed plate and a movable plate of the machine, respectively, said mold-halves including therein a required number of parison cavities and blow-molding cavities arranged symmetrically about a plane between the female mold half; a male mold (or core) having a blowing hole therethrough is included in each of the parison cavities and the blow-molding cavities, and male mold supporting member which is fixed to a rotating shaft passed through one of the mold-halves attached to the fixed plate supports said male molds (or cores) on the periphery of said member, the improvement comprising a required number of hot-runner blocks provided in contact with said parison cavities, a hot-runner nozzle disposed between each of said hot-runner blocks and each of said parison cavities, and a gate provided for each parison cavity for separating the bottom of a parison from the hot-runner nozzle.

The nature, principle, and utility of the present invention will be more clearly understood from the hereinafter described detailed description of the invention when read in conjunction with the accompanying drawings, wherein like parts are designated by like reference numerals.

DETAILED DESCRIPTION OF THE INVENTION

Figure 1:
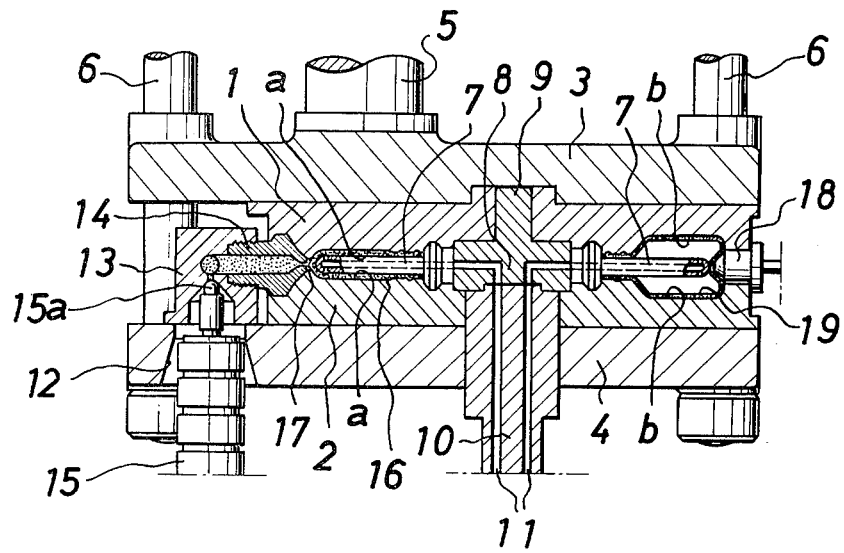
FIGS. 1 through 3 are plan views, partly in section, of an injection blow-molding machine constituting an embodiment of the present invention, each of the FIGURES indicating blow-molding processes sequentially.
Figure 2:
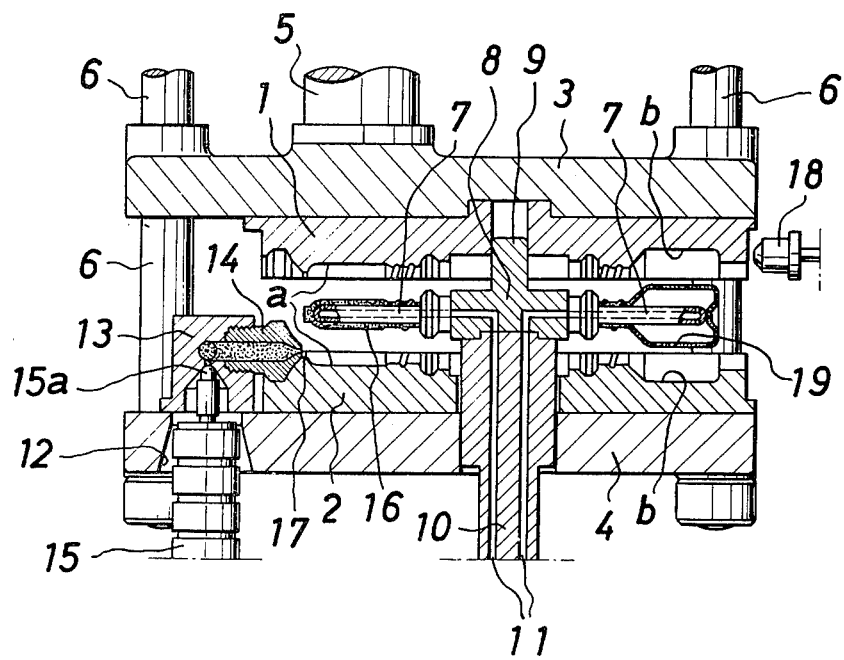
Figure 3:
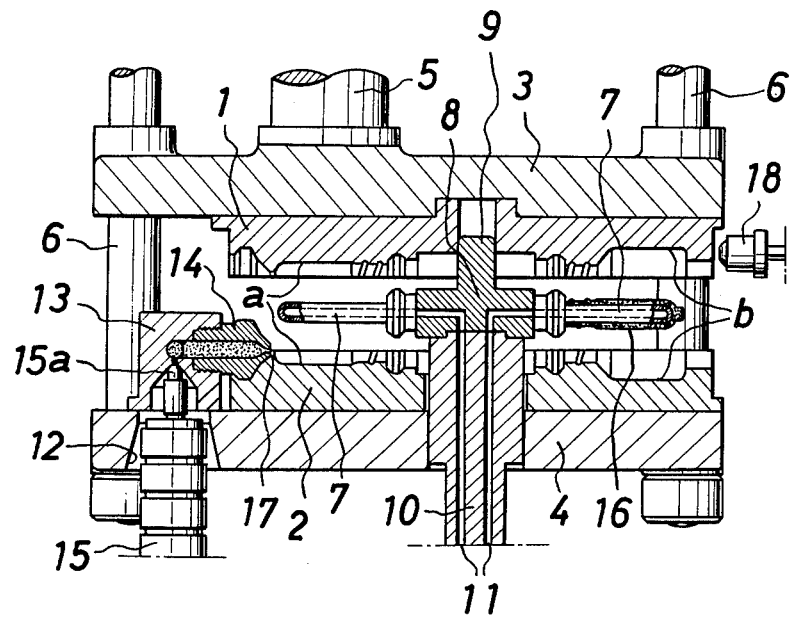

Referring to FIGS. 1 through 3, there are indicated a female mold separable through its mating surface into two mold-halves 1 and 2, and a movable plate 3 and a fixed plate 4 on which the mold-halves 1 and 2 are attached, respectively. In the female mold, there are formed a required number of parison cavities a and blowing cavities b disposed symmetrically in a single plane.

The movable plate 3 is fixed to a mold clamping ram 5 and is moved to open or close the mold-halves 1 and 2 under the guidance of a required number of tie-rods 6, 6, ... erected from the fixed plate 4. A plurality of male molds (or cores) 7, 7, ... adapted to the female mold are disposed around the periphery of a male-mold supporting disc 8 located at the central portion of the female mold. Furthermore, the arrangement of the male molds is such that each of the male molds is included in each of the parison cavities a and blowing cavities b, and a blowing hole is bored through each of the male molds.

The male-mold supporting disc 8 can be rotated freely in a plane parallel to the mating plane of the female mold-halves 1 and 2 with a spindle portion 9 thereof received in a through hole bored at the center of the movable mold-half 1 and the other side of the supporting disc 8 being detachably coupled to a rotating shaft 10 passing through the fixed mold-half 2 and the fixed plate 4. Air passages 11, 11 bored through the rotating shaft 10 are connected respectively to the blowing holes in the male molds 7, 7 ... through passages bored through the supporting disc 8.

Furthermore, in this embodiment, a required number of injection-nozzle inserting holes 12 are bored through the fixed plate 4 at portions facing to the outer ends of the parison cavities a, and a corresponding number of hot-runner blocks 13 are fixed to the inner ends of the holes 12. The hot-runner blocks 13 are fixed to the above-mentioned positions in such a manner that a distance is maintained from the end surfaces of the mold-halves 1, 2, or with a heat insulating substance interposed between the end surfaces and the hot-runner blocks 13 so that the mold-halves 1, 2 are protected from the high temperature of the hot-runner blocks 13.

Between each of the hot-runner blocks 13 and the parison cavities a, a hot-runner nozzle 14 is placed in alignment with the separating plane of the mold-halves 1, 2, and another nozzle 15a of injection device 15 is provided to touch the hot-runner block 13. Thus the melted material injected from the nozzle 15a of the injection device 15 is introduced through the hot-runnner nozzle 14 into the parison cavity corresponding to the nozzle 14.

Thus a parison 16 having bottom is formed in each of the parison cavities a around the male mold 7. After the completion of the parisons, the female mold halves are opened, and the parisons formed around the male molds 7, 7, . . . are rotated out of the parison cavities into the molding cavities b under the rotation of the rotating shaft 10. In this case, if the bottom end of the parisons 16 contact with the tip of the hot-runner nozzles 14, the end portion of the parisons will be deformed.

To overcome such a drawback, a gate 17 in the form of a channel is provided for each of the parison cavities a in the embodiment of the invention in such a manner that the bottom portion of the parison is thereby separated from the hot-runner nozzle 14. As a result, the tip of the hot-runner nozzle 14 is brought into contact with the gate portion 7 of each of the parison cavities.

Figure 4:
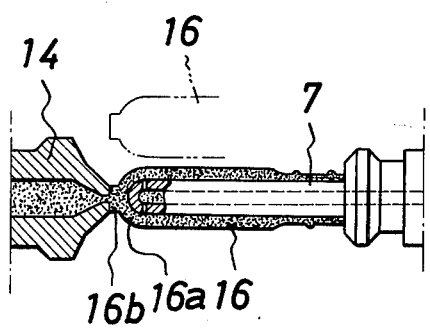
FIG. 4 is a plan view, partly in section, showing the relation between the hot-runner nozzle and a parison having bottom.
Figure 5:
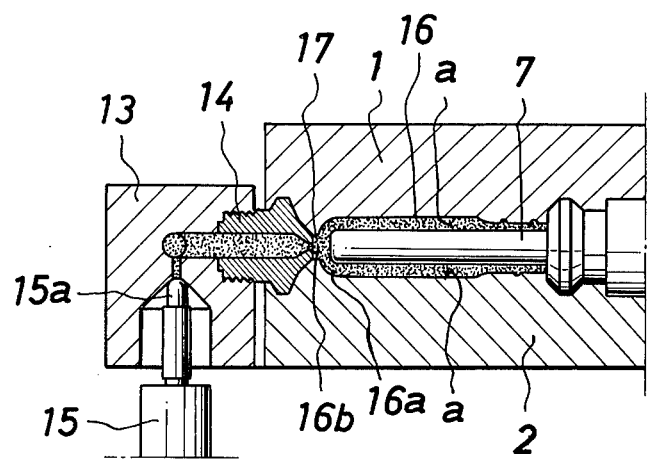
FIG. 5 is a plan view, partly in section, showing an important part in FIG. 1.
Figure 6:
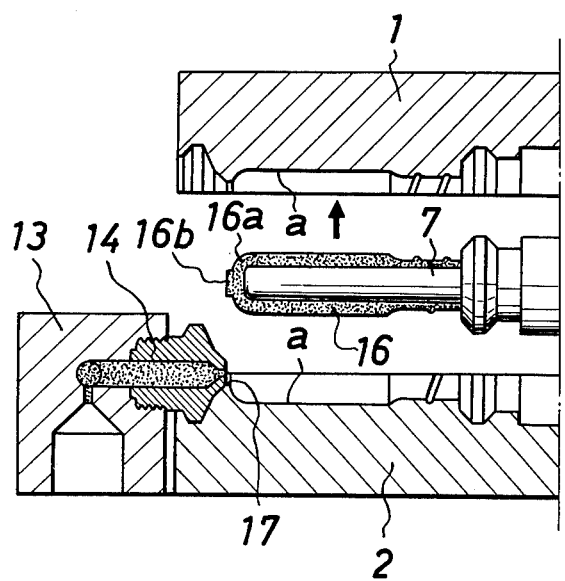
FIG. 6 is a plan view, partly in section, showing an important part in FIG. 2.

For this reason, when the melted material is injected through the hot-runner nozzles 14 into the parison cavities a to form parisons having bottoms, a projected portion 16b is formed between the end of the bottom 16a of each parison and the tip of the hot-runner nozzle 14 (see FIGS. 4 and 5). Because of the formation of the projected portion 16b, the deformation of the bottom of the parison at the time of being removed from the parison cavity can be substantially eliminated. That is, when the parisons are removed from the parison cavities under the rotation of the rotating shaft 10, only the projected portions 16b at the end of the bottoms of these parisons will be scratched by the tips of the hot-runner nozzles 14, and any deformation or damage caused on the bottom of the parison can be prevented.

Furthermore, the above described projected portion 16b of the parison 16 is compressed between the tip of the male mold 7 and a bottom core 18 when the parison is brought into the blow-molding cavity and blown into an article. As a result, the projected portion 16b is flattened, and a uniform thickness of the bottom wall of the article can be obtained.

According to the present invention, since a hot-runner nozzle is provided in each of the hot-runner blocks, the melted material can be injected through the hot-runner nozzle into each of the parison cavities, whereby the conduction of heat from the high temperature hot-runner blocks to the mold-halves can be substantially reduced and the temperature of the parison can be uniformly distributed. When the parison of a uniformly distributed temperature is blow-molded in the molding cavity, an article of uniform thickness can be obtained.

Furthermore, because a gate in the form of a channel is provided between the hot-runner nozzle and the end of the bottom of the parison, removal of the parison formed around the male mold from the parison cavity can be carried out without causing deformation or damage on the bottom of the parison, whereby the formation of parison by the use of hot-runner can be realized.

I claim:

1. In an injection blow-molding machine of the type comprising a pair of female mold-halves attached to a movable plate and a fixed plate, respectively, with a parison cavity and a blow-molding cavity being formed symmetrically about a plane between the female mold-halves, and corresponding to each cavity a male mold having a blow hole therethrough and supported around a male mold supporting member fixed to a rotating shaft extended freely rotatable through the one of the female mold-halves which is attached to the fixed plate, wherein the improvement comprises a fixed hot-runner block, operable to receive an injection nozzle and receive molten material therefrom, is provided adjacent to the fixed mold half defining said parison cavity, wherein further a fixed hot-runner nozzle is disposed between the parison cavity and the hot-runner block, said fixed hot-runner nozzle having an inlet operable to receive and communicate molten material from said hot-runner block to a hot-runner nozzle outlet orifice, which is disposed perpendicular to said plane of symmetry and is operable to inject said molten material into said parison cavity, wherein further a gate in the form of a channel is provided within said fixed mold half, and between the outlet of said fixed hot-runner nozzle and said parison cavity, to cause a projecting portion to be formed on the bottom of each parison produced in the parison cavity, whereby molten material from said injection nozzle is communicated from said injection nozzle, through said hot-runner block and out of said fixed hot-runner nozzle outlet into said gate to there define a projecting portion of said parison immediately adjacent said hot-runner nozzle outlet, whereby said projecting portion remains attached to the bottom of the parison after the mold halves have been opened and said male mold supporting member is raised out of said fixed mold half, in a direction perpendicular to said plane of symmetry.

2. An injection blow-molding machine as set forth in claim 5 wherein said hot-runner block is heat-insulated from said parison cavity through being spaced out of contact with adjacent end surfaces of said mold halves.

3. An injection blow-molding machine as set forth in claim 5 wherein said hot-runner nozzle is supported between complementary mating surfaces in the female mold-halves and in an axial alignment with the parison and blow-molding cavities, respectively.

* * * * *